United States Patent
Oga et al.

(10) Patent No.: US 8,155,790 B2
(45) Date of Patent: Apr. 10, 2012

(54) ROBOT CONTROL APPARATUS

(75) Inventors: Junichiro Oga, Kawasaki (JP); Junji Oaki, Kawasaki (JP); Hideki Ogawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 399 days.

(21) Appl. No.: 12/597,958

(22) PCT Filed: Sep. 28, 2009

(86) PCT No.: PCT/JP2009/004941
§ 371 (c)(1),
(2), (4) Date: Oct. 28, 2009

(87) PCT Pub. No.: WO2010/050119
PCT Pub. Date: May 6, 2010

(65) Prior Publication Data
US 2011/0060460 A1 Mar. 10, 2011

(30) Foreign Application Priority Data
Oct. 31, 2008 (JP) ................. 2008-282312

(51) Int. Cl.
*G06F 19/00* (2006.01)
*B25J 13/08* (2006.01)

(52) U.S. Cl. ........ 700/261; 700/249; 700/251; 700/254; 901/34; 318/568.2

(58) Field of Classification Search .................. 700/260, 700/254, 261, 249, 247; 901/16, 49, 15, 901/18, 30, 34; 318/568.11, 568.2
See application file for complete search history.

(56) References Cited

U.S. PATENT DOCUMENTS

| 4,975,856 | A * | 12/1990 | Vold et al. ..... 700/263 |
| 7,390,309 | B2 * | 6/2008 | Dariush ..... 601/5 |
| 7,657,345 | B2 * | 2/2010 | Endo et al. ..... 700/249 |
| 2005/0113973 | A1 * | 5/2005 | Endo et al. ..... 700/245 |
| 2007/0013336 | A1 * | 1/2007 | Nowlin et al. ..... 318/568.21 |
| 2007/0255454 | A1 * | 11/2007 | Dariush ..... 700/245 |

FOREIGN PATENT DOCUMENTS
JP 2003-245881 9/2003

OTHER PUBLICATIONS

International Search Report for PCT/JP2009/004941 mailed on Dec. 23, 2009.
Written Opinion of the International Searching Authority for PCT/JP2009/004941 mailed Dec. 23, 2009.
Kubo, et al. Attitude Control of Planar End-Effector and Estimation of Contact Point Using Parallel Mechanism, Electronics and Communications in Japan, vol. 91, No. 3, 2008.
Mashimo, et al. High speed positioning system considering unknown coulomb friction and inertia variation, The 30th Annual Conference on the IEEE Industrial Electronics Society, Nov. 2004.

\* cited by examiner

*Primary Examiner* — Ronnie Mancho
(74) *Attorney, Agent, or Firm* — Turocy & Watson, LLP

(57) ABSTRACT

A robot control apparatus includes: a drive unit (101) driving an actuator (115) based on a torque command value; a drive torque estimation unit (107) estimating a drive torque from a joint shaft angle; an external torque calculation unit (108) calculating a difference between the estimated drive torque and the torque command value as an external torque; a Jacobian matrix calculation unit (105) calculating a Jacobian matrix based on the joint shaft angle; an external force calculation unit (109) calculating an external force from the Jacobian matrix and the external torque; and a correction amount calculation unit (110) calculating a correction amount from the external force.

4 Claims, 7 Drawing Sheets

ROBOT CONTROL APPARATUS

TECHNICAL FIELD

The present invention relates to a robot control apparatus and a robot control method.

BACKGROUND ART

In so-called force control in which a tip end such as an arm tip end portion of a robot (hereinafter, simply referred to as a "tip end") controls a position and contact force thereof in a task coordinate system while contacting a subject, it is important to estimate external force that acts on the tip end, and to flexibly correct an operation of the tip end so that the operation can correspond to the external force. In the case where a force sensor is attached to the tip end, the external force can be measured highly accurately. However, since the force sensor is fragile against impact as well as is expensive, it is frequent that use of the force sensor is avoided.

In the case where the force sensor is not used, it is necessary to estimate external torque of an actuator, which is generated by an influence of the external force that acts on the robot, in order to estimate the external force. The external torque is calculated by estimating drive torque necessary for motion of the actuator and subtracting the estimated drive torque from an actual torque command value sent to a drive unit (amplifier). For example, a method is known, which calculates the drive torque from a joint command for each joint, estimates the external torque from a difference between the calculated drive torque and the torque command value, and converts the estimated external torque into the external force in the task coordinate system (refer to Patent Literature 1 (JP 405-4984)).

However, though it is necessary to highly accurately estimate parameters of a dynamics model in advance in order to estimate the drive torque, realization of such parameter estimation involves difficulty. In particular, though friction force is an item having a large influence in the drive torque, a friction coefficient thereof changes largely by an operation velocity, operation direction, operation history and operation environment of the actuator, a load attached to the tip end, and the like. Accordingly, it is difficult to estimate the friction coefficient precisely. In the motion of the actuator in the task coordinate system, an operation direction of a joint shaft thereof changes frequently and complicatedly. Accordingly, it cannot be said that external force estimation in each joint shaft, which is as described in Patent Literature 1, is just sufficient. As described above, in the case where the force sensor is not used in the external force estimation, it has been difficult to estimate the external force more highly accurately, and to provide stable force control.

Citation List

Patent Literature

PTL 1: JP 405-4984

SUMMARY OF INVENTION

Technical Problem

An object of the present invention is to provide a robot control apparatus and a robot control method, which can estimate an external force more highly accuracy and provide stable force control without using a force sensor.

Solution to Problem

An aspect of the present invention inheres in a robot control apparatus controlling a robot having a joint shaft and a drive shaft transmitting a drive force from an actuator to the joint shaft, including: an angle detection unit configured to detect an angle of the drive shaft; a angle calculation unit configured to calculate an angle of the joint shaft from the angle of the drive shaft; a tip end position calculation unit configured to calculate a position of the robot from the angle of the joint shaft; a command value creation unit configured to create a position command value of the tip end position; an error calculation unit configured to calculate an error between the tip end position and the position command value; a difference calculation unit configured to calculate a joint angle difference from the error by inverse kinematic calculation; a command value calculation unit configured to calculate a torque command value by integrating the joint angle difference; a drive unit configured to drive the actuator based on the torque command value; a drive torque estimation unit configured to estimate a drive torque for driving the actuator from the angle of the joint shaft; an external torque calculation unit configured to calculate a difference between the estimated drive torque and the torque command value as an external torque; a Jacobian matrix calculation unit configured to calculate a Jacobian matrix between a task coordinate system and a joint coordinate system of the robot based on the angle of the joint shaft; an external force calculation unit configured to calculate an external force acting the tip end position from the Jacobian matrix and the external torque; a compliance model memory configured to store a compliance model in the tip end position; and a correction amount calculation unit configured to calculate a correction amount for the position command value corresponding to the external force using the compliance model, and configured to changes gain for the compliance model from the Jacobian matrix.

Advantageous Effects of Invention

A robot control apparatus and a robot control method according to the present invention have the advantage that it is possible to estimate an external force more highly accuracy and provide stable force control without using a force sensor.

DESCRIPTION OF EMBODIMENTS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

MODE FOR THE INVENTION

Figure 1:
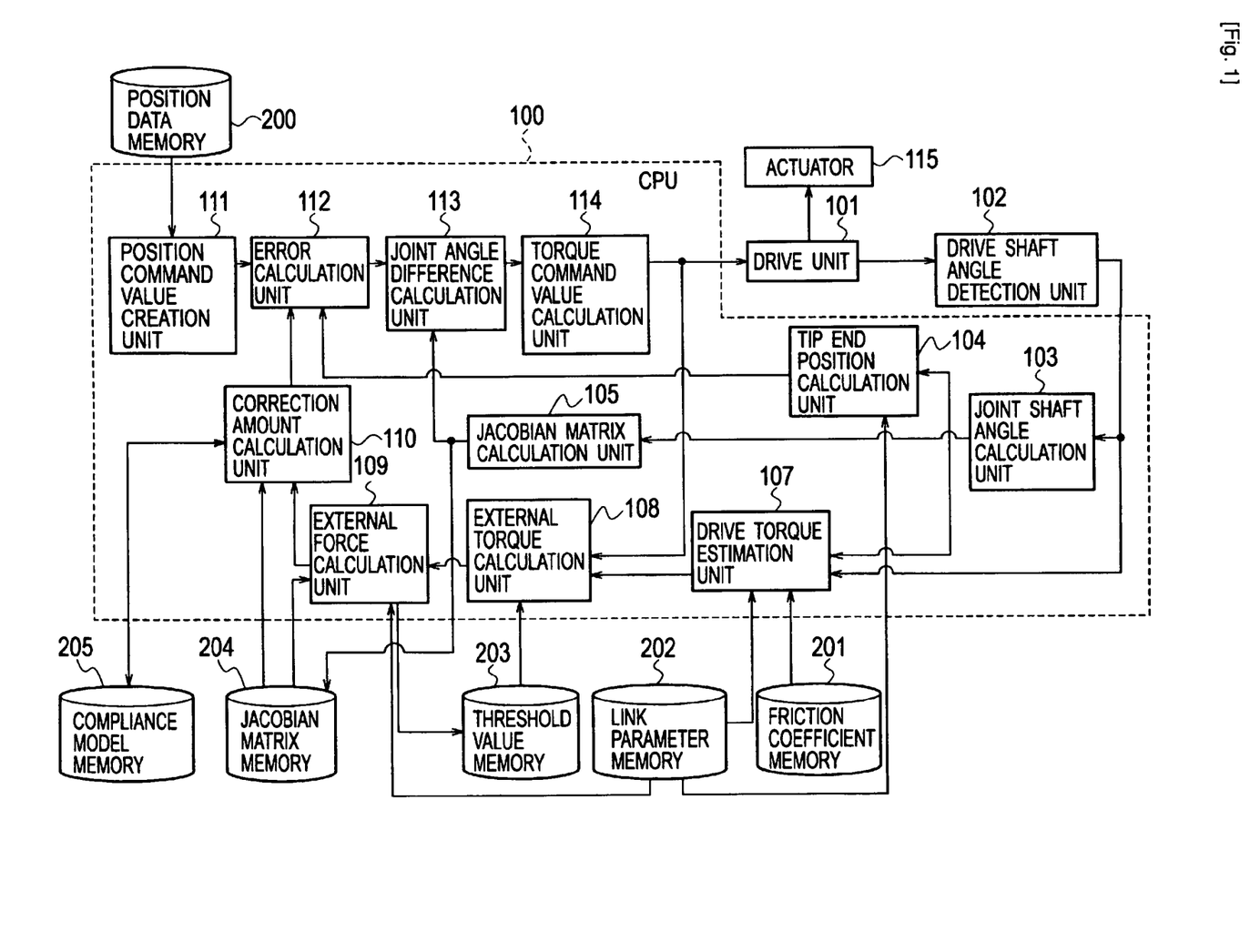
FIG. 1 is a block diagram showing an example of a robot control apparatus according to an embodiment of the present invention.

As shown in FIG. 1, a robot control apparatus according to the embodiment of the present invention includes a central processing unit (CPU) 100, a drive unit (amplifier) 101, a drive shaft angle detection unit 102, a position data memory 200, a friction coefficient memory 201, a link parameter memory 202, a threshold value memory 203, a Jacobian matrix memory 204 and a compliance model memory 205.

Figure 2:
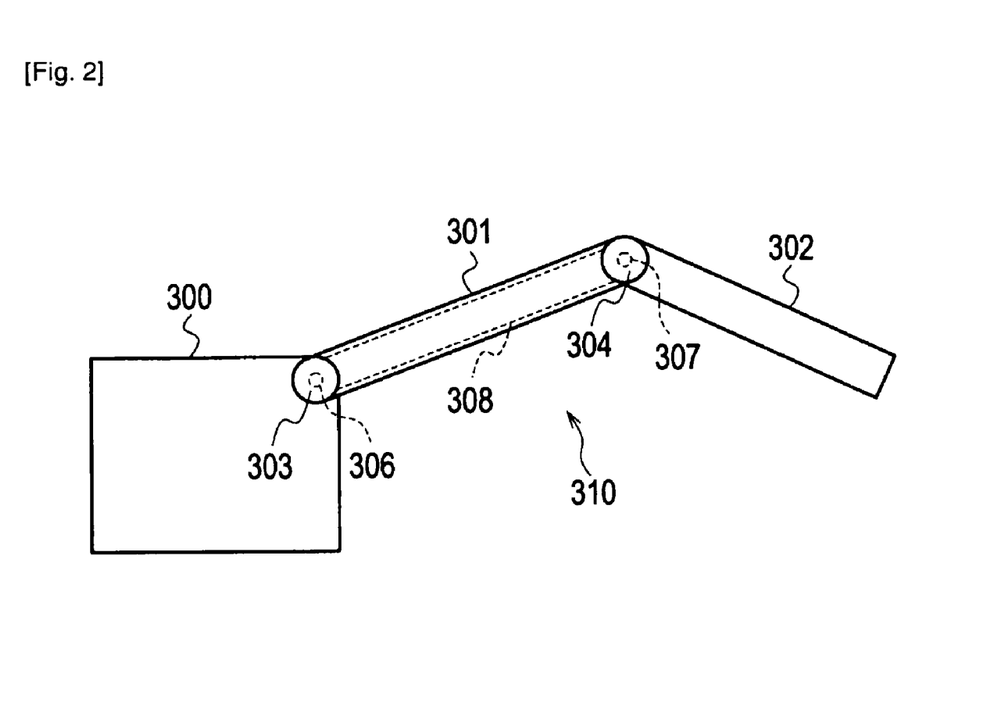
FIG. 2 is a schematic view showing an example of control subject according to the embodiment.

As schematically shown in FIG. 2, a robot taken as an example of a control subject in the embodiment of the present invention includes a body 300, and a movable portion 310 provided on the body 300. The movable portion 310 has: a plurality of links 301 and 302; a plurality of joints 306 and 307 composed of a drive pulley 303, a driven pulley 304 and the like; and a transmission mechanism 308 wound around the drive pulley 303 and the driven pulley 304.

Figure 3:
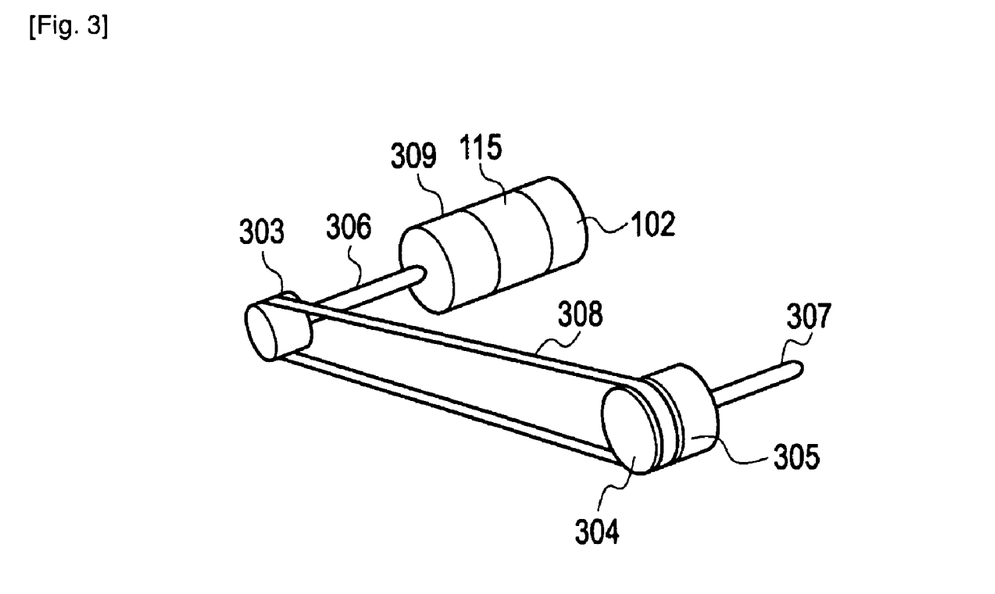
FIG. 3 is another schematic view showing the example of the control subject according to the embodiment.

As schematically shown in FIG. 3, the drive pulley 303, a velocity reducer 309, an actuator 115 and a drive shaft angle detection unit 102 are attached to the drive shaft (joint) 306. The actuator 115 drives rotationally, and the velocity reducer 309 reduces the number of revolutions of the actuator 115 and increases torque thereof. Meanwhile, the driven pulley 304 and a joint shaft angle detection unit 305 are attached to the joint shaft (joint) 307. The drive shaft 306 rotates, whereby the joint shaft 307 is driven rotationally through the drive pulley 303, the transmission mechanism (belt) 308 and the driven pulley 304. In the embodiment of the present invention, for the sake of simplification, a description will be made of the case of making control for the drive shaft 306 and the joint shaft 307.

As each of the drive shaft angle detection unit 102 and the joint shaft angle detection unit 305, a position sensor such as an encoder is usable. Each of the drive shaft angle detection unit 102 and the joint shaft angle detection unit 305 may include a filter that removes a predetermined frequency component. The drive shaft angle detection unit 102 detects a displacement amount (drive shaft angle) of a position of the drive shaft 306. The joint shaft angle detection unit 305 detects a displacement amount (joint shaft angle) of a position of the joint shaft 307.

The CPU 100 shown in FIG. 1 logically includes an joint shaft angle calculation unit 103, a top end position calculation unit 104, a Jacobian matrix calculation unit 105, an drive torque estimation unit 107, an external torque calculation unit 108, an external force calculation unit 109, a correction amount calculation unit 110, a position command value creation unit 111, an error calculation unit 112, a joint angle difference calculation unit 113 and a torque command value calculation unit 114 as modules (logic circuits) which are hardware resources.

The joint shaft angle calculation unit 103 calculates the joint shaft angle from the drive shaft angle detected by the drive shaft angle detection unit 102 in response to a ratio of the drive shaft 306 and the joint shaft 307, which is owned by the transmission mechanism 308, and is such as a reduction ratio of the velocity reducer 309. Note that the joint shaft angle may be detected directly by the joint shaft angle detection unit 305 attached to the joint shaft 307.

The top end position calculation unit 104 reads out a link parameter from the link parameter memory 202, and calculates a tip end position in a task coordinate system of the robot from the joint shaft angle, which is calculated by the joint shaft angle calculation unit 103, by forward kinematic calculation by using the link parameter.

The Jacobian matrix calculation unit 105 calculates a Jacobian matrix from the joint shaft angle calculated by the joint shaft angle calculation unit 103, and stores the calculated Jacobian matrix in the Jacobian matrix memory 204. The Jacobian matrix is a matrix that expresses a minute displacement relationship between the task coordinate system and joint coordinate system of the robot. Between an error

[Math. 1]

$$\Delta x$$

and a joint angle difference
[Math. 2], $$\Delta \theta$$

a relationship of Expression (1) is established, where J is the Jacobian matrix.
[Math. 3]

$$\Delta x = J \Delta \theta \qquad (1)$$

Figure 4:
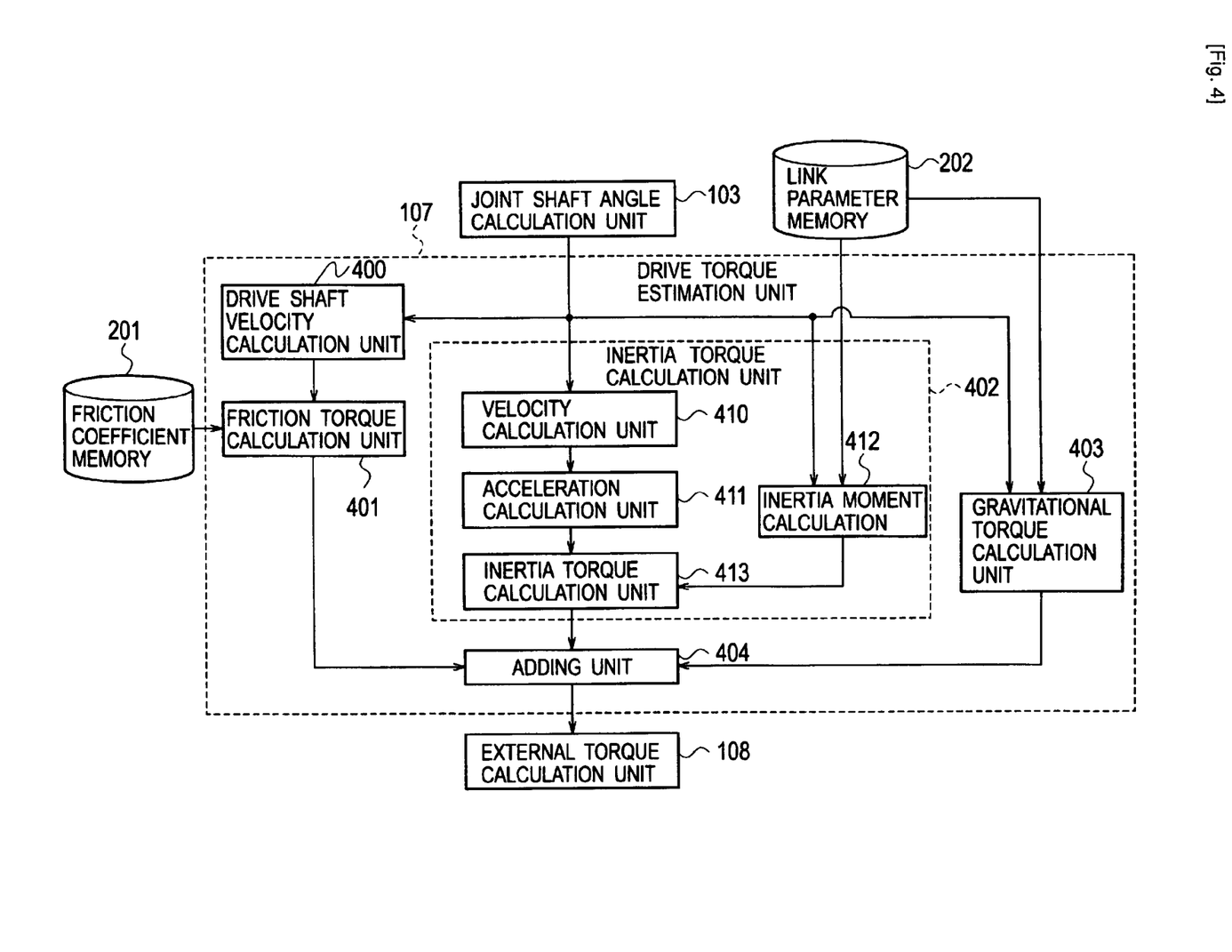
FIG. 4 is a block diagram showing an example of a drive torque estimation unit according to the embodiment.

The drive torque estimation unit 107 estimates drive torque, which is necessary to drive the joint shaft 307 of the robot, from the joint shaft angle calculated by the joint shaft angle calculation unit 103. As shown in FIG. 4, the drive torque estimation unit 107 includes a drive shaft velocity calculation unit 400, a gravity torque calculation unit 403, an inertia torque calculation unit 402, a friction torque calculation unit 401 and an adding unit 404.

The drive shaft velocity calculation unit 400 calculates a drive shaft velocity by taking, for example, a time difference from the joint shaft angle calculated by the joint shaft angle calculation unit 103. The friction torque calculation unit 401 reads out a friction coefficient stored in the friction coefficient memory 201, and calculates friction torque, which is equivalent to Coulomb friction, viscous friction or the like, from the drive shaft velocity calculated by the drive shaft velocity calculation unit 400 and from the friction coefficient.

The inertia torque calculation unit 402 includes a velocity calculation unit 410, an acceleration calculation unit 411, an inertia moment calculation unit 412 and an inertia torque calculation unit 413. The velocity calculation unit 410 calculates a joint angular velocity from the joint shaft angle calculated by the joint shaft angle calculation unit 103. The acceleration calculation unit 411 calculates a joint angular acceleration from the joint angular velocity calculated by the velocity calculation unit 410. The inertia moment calculation unit 412 reads out the link parameter from the link parameter memory 202, and calculates an inertia moment of each of the links 301 and 302 from the joint shaft angle calculated by the joint shaft angle calculation unit 103 and from the link parameter. The inertia torque calculation unit 413 calculates inertia torque from the joint angular acceleration calculated by the acceleration calculation unit 411, and from the inertia moment calculated by the inertia moment calculation unit 412.

The gravity torque calculation unit 403 reads out the link parameter from the link parameter memory 202, calculates gravity, which acts on each of the links 301 and 302, from the joint shaft angle calculated by the joint shaft angle calculation unit 103 by using the link parameter, and calculates gravity torque that compensates the gravity concerned.

The adding unit 404 adds up the friction torque calculated by the friction torque calculation unit 401, the inertia torque calculated by the inertia torque calculation unit 413, and the gravity torque calculated by the gravity torque calculation unit 403, and calculates a thus obtained total as estimated drive torque.

The external torque calculation unit 108 shown in FIG. 1 calculates, as external torque, a difference between the drive torque estimated by the drive torque estimation unit 107 and the torque command value calculated by the torque command value calculation unit 114.

Figure 5:
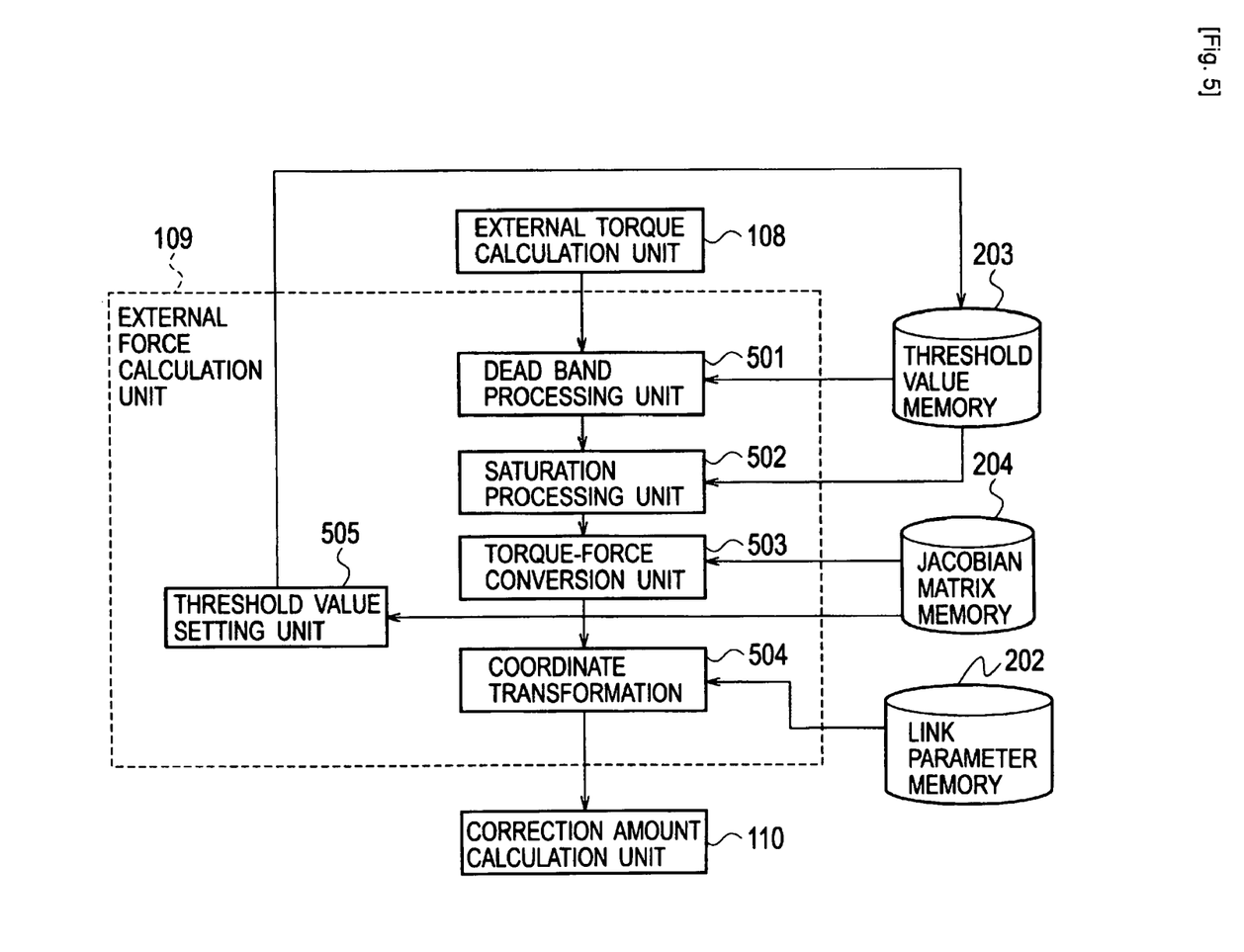
FIG. 5 is a block diagram showing an example of an external force calculation unit according to the embodiment.

The external force calculation unit 109 calculates external force from the external torque, which is calculated by the external torque calculation unit 108, by using the Jacobian matrix calculated by the Jacobian matrix calculation unit 105. As shown in FIG. 5, the external force calculation unit 109 includes a dead band processing unit 501, a saturation processing unit 502, a torque-force conversion unit 503, a coordinate conversion unit 504 and a threshold value setting unit 505.

The dead band processing unit 501 reads out a minimum threshold value (minimum external torque)
[Math. 4]

$$\tau_{dmin}$$

stored in the threshold value memory 203, and determines whether or not the external torque
[Math. 5]

$$\tau_d$$

in each shaft, which is calculated by the external torque calculation unit 108, is smaller than the minimum threshold value
[Math. 6]

$$\tau_{dmin}$$

If the external torque
[Math. 7]

$$\tau_d$$

is smaller than the minimum threshold value
[Math. 8]

$$\tau_{dmin}$$

as in Expression (2), then the dead band processing unit 501 determines the external torque
[Math. 9]

$$\tau_d$$

to be located in a dead band and regards the external torque
[Math. 10]

$$\tau_d$$

as 0 because it is highly possible that the external torque
[Math. 11]

$$\tau_d$$

thus calculated may be noise, and so on.
[Math. 12]

$$\text{if } |\tau_d| \leq |\tau_{dmin}|, \tau_d = 0 \quad (2)$$

The saturation processing unit 502 reads out a maximum threshold value (maximum external torque)
[Math. 13]

$$\tau_{dmax}$$

stored in the threshold value memory 203, and determines whether or not the external torque
[Math. 14]

$$\tau_d$$

in each shaft, which is calculated by the external torque calculation unit 108, is larger than the maximum threshold value
[Math. 15]

$$\tau_{dmax}$$

If the external torque
[Math. 16]

$$\tau_d$$

exceeds the maximum threshold value
[Math. 17]

$$\tau_{dmax}$$

as in Expression (3), then the external torque
[Math. 18]

$$\tau_d$$

is reduced to a value of the maximum threshold value
[Math. 19]

$$\tau_{dmax}$$

in order to avoid breakage of the control subject in contact with the tip end.
[Math. 20]

$$\text{if } |\tau_d| \geq |\tau_{dmax}|, |\tau_d| = |\tau_{dmax}| \quad (3)$$

The torque-force conversion unit 503 converts the external torque into the external force in the task coordinate system by using the Jacobian matrix calculated by the Jacobian matrix calculation unit 105. Based on the principle of virtual work, the external torque
[Math. 21]

$$\tau_d$$

is multiplied by an inverse matrix of a transpose matrix $J^T$ of the Jacobian matrix J as in Expression (4), whereby the external force $f_d$ is calculated.
[Math. 22]

$$f_d = (J^T)^{-1} \tau_d \quad (4)$$

where the external force $f_d$ in Expression (4) is external force when the external force concerned is assumed to act on the tip end. In the case where a point of application of the external force $f_d$ is a point other than the tip end, the coordinate conversion unit 504 performs coordinate conversion for the external force $f_d$ into external force on the actual point of application.

The threshold value setting unit 505 individually sets the minimum threshold value
[Math. 23]

$$\tau_{dmin}$$

and the maximum threshold value
[Math. 24]

$$\tau_{dmax}$$

based on the Jacobian matrix stored in the Jacobian matrix memory 204, and stores the set minimum threshold value
[Math. 25]

$$\tau_{dmin}$$

and maximum threshold value
[Math. 26]

$$\tau_{dmax}$$

in the threshold value memory 203. Here, the friction coefficient of the friction force changes by the velocity and operation direction of the actuator 115. In particular, at the time when the actuator 115 starts to move from a static state, the maximum static friction force becomes dominant, and is larger than viscous friction force and dynamical friction force, which become dominant as the velocity is being increased. Discontinuity of the shaft velocity at around 0 largely affects estimation errors of the friction torque, and further, of the drive torque. Accordingly, the minimum threshold value
[Math. 27]

$$\tau_{dmin}$$

is set so as to increase the dead band at the shaft velocity of around 0. Specifically, the minimum threshold value
[Math. 28]

$$\tau_{dmin}$$

is set so as to be increased at the shaft velocity of around 0. It is determined whether or not the shaft velocity is around 0 based on such phenomena that a determinant of the Jacobian matrix is reduced, that an absolute value of a diagonal component of the Jacobian matrix is reduced. In particular, during linear motion in the task coordinate system, it is possible that only an operation direction of a certain joint may change, and in this case, the Jacobian matrix takes a minimum value before and after such a change. Hence, the threshold value setting unit 505 calculates a rate of change of the Jacobian matrix stored in the Jacobian matrix memory 204, and determines whether or not the shaft velocity is around 0 based on this rate of change of the Jacobian matrix.

The correction amount calculation unit 110 shown in FIG. 1 reads out a compliance model from the compliance model memory 205, and calculates a correction amount of the tip end position, which corresponds to the external force calculated by the external force calculation unit 109, by using the compliance model. Here, the compliance model is a model in which inertia, viscosity and rigidity are virtually assumed between the tip end and the contact subject (control subject), for example, as in Expression (5).
[Math. 29]

$$M\Delta\ddot{x}+D\Delta\dot{x}+K\Delta x=K_f f_d \qquad (5)$$

where
[Math. 30]

$$\Delta x$$

is an error in the task coordinate system,
[Math. 31]

$$\Delta\dot{x}$$

is a velocity in the task coordinate system,
[Math. 32]

$$\Delta\ddot{x}$$

is an acceleration vector in the task coordinate system, M is an inertia matrix, D is a viscosity coefficient matrix, K is a rigidity coefficient matrix, and $K_f$ is a force feedback gain matrix. A compliance selection matrix that switches a shaft, on which the force is made to act, and of which position is changed, takes a form including the force feedback gain matrix $K_f$. The velocity
[Math. 33]

$$\Delta\dot{x}$$

and acceleration vector
[Math. 34]

$$\Delta\ddot{x}$$

of the error can be approximated by a single time difference and double time differences of such a position error vector
[Math. 35]

$$\Delta x,$$

respectively. Accordingly, the correction amount
[Math. 36]

$$\Delta x_{comp}$$

of the tip end position in the compliance model can be calculated as in Expression (6).

[Math. 37]

$$\Delta x_{comp} = \frac{1}{K}(K_f f_d - M\Delta\ddot{x} - D\Delta\dot{x}) \qquad (6)$$

The position command value creation unit 111 reads out target tip end position data stored in the position data memory 200, and calculates an interpolated tip end position command value in each control cycle from the target tip end position data.

The error calculation unit 112 calculates the error
[Math. 38]

$$\Delta x,$$

which takes in consideration the correction amount
[Math. 39]

$$\Delta x_{comp}$$

as in Expression (7), from the tip end position command value created by the position command value creation unit 111, a current tip end position x calculated by the top end position calculation unit 104, and the correction amount
[Math. 40]

$$\Delta x_{comp}$$

calculated by the correction amount calculation unit 110.
[Math. 41]

$$\Delta x = x_R - x + \Delta x_{comp} \qquad (7)$$

The joint angle difference calculation unit 113 calculates the joint angle difference
[Math. 42]

$$\Delta\theta$$

as in Expression (8) from the error
[Math. 43]

$$\Delta x,$$

which is calculated by the error calculation unit 112, by using an inverse matrix of the Jacobian matrix J.
[Math. 44]

$$\Delta\theta = J^{-1}\Delta x \qquad (8)$$

The torque command value calculation unit 114 integrates the joint angle difference calculated by the joint angle difference calculation unit 113, and thereby creates the torque command value (target control value). The drive unit 101 drives the actuator 115 in accordance with the torque command value calculated by the torque command value calculation unit 114.

A semiconductor memory, a magnetic disk, an optical disk, a magneto-optical disk, a magnetic tape or the like may be used for the position data memory 200, the friction coefficient memory 201, the link parameter memory 202, the threshold value memory 203, the Jacobian matrix memory 204 and the compliance model memory 205.

The position data memory 200 stores a target tip end position data string to be used by the position command value creation unit 111 for creating the tip end position command value. The friction coefficient memory 201 stores friction coefficient data, which is to be used by the friction torque calculation unit 401 for calculating the friction torque, and is obtained from a velocity-torque relationship in advance in a constant velocity operation. The link parameter memory 202 stores the link parameters regarding the links 301 and 302 of the robot. The threshold value memory 203 stores a minimum threshold value
[Math. 45]

$$\tau_{dmin}$$

and a maximum threshold value
[Math. 46]

$$\tau_{dmax},$$

which are preset depending on task contents and the operation velocity, and the minimum threshold value
[Math. 47]

$$\tau_{dmin}$$

and the maximum threshold value
[Math. 48]

$$\tau_{dmax},$$

which are set by the threshold value setting unit 505. The Jacobian matrix memory 204 stores the Jacobian matrix calculated by the Jacobian matrix calculation unit 105. The compliance model memory 205 stores the preset compliance model, and the compliance model changed by the correction amount calculation unit 110.

<Robot Control Method>

Next, a description will be made of a robot control method according to the embodiment of the present invention while referring to a flowchart of FIG. 6.

In Step S100, a control arithmetic operation is started. In Step S101, the position command value creation unit 111 reads out the target tip end position data string from the position data memory 200, and creates the tip end position command value in each control cycle based on the target tip end position data string. In Step S102, the error calculation unit 112 calculates the error that takes in consideration the correction amount of the tip end position, which will be described later, for the error between the tip end position command value created by the position command value creation unit 111 and the tip end position calculated by the top end position calculation unit 104. In Step S103, the joint angle difference calculation unit 113 performs the inverse kinematic calculation as shown in Expression (8) for the error, which is calculated by the error calculation unit 112, by using the Jacobian matrix read out from the Jacobian matrix memory, and thereby calculates the joint angle difference. In Step S104, the torque command value calculation unit 114 integrates the joint angle difference calculated by the joint angle difference calculation unit 113, and thereby calculates the torque command value. In Step S105, the drive unit 101 drives the actuator 115 by taking, as the target control value, the torque command value calculated by the torque command value calculation unit 114, thereby drives the drive shaft 306, and controls the tip end position of the joint. In Step S106, it is determined whether or not the control arithmetic operation is ended, and in the case where it is determined that the control arithmetic operation is ended, then the processing is ended in Step S107. In the case where it is determined in Step S106 that the control arithmetic operation is not ended, then the processing proceeds to Step S108.

In Step S108, the drive shaft angle detection unit 102 detects the drive shaft angle. In Step S109, the joint shaft angle calculation unit 103 calculates the joint shaft angle from the drive shaft angle, which is calculated by the drive shaft angle detection unit 102, based on the reduction ratio of the velocity reducer, and the like. In Step S110, the top end position calculation unit 104 reads out the link parameter from the link parameter memory 202, and calculates the tip end position from the joint shaft angle, which is calculated by the joint shaft angle calculation unit 103, by the forward kinematic calculation by using the link parameter. In Step S111, the Jacobian matrix calculation unit 105 calculates the Jacobian matrix from the joint shaft angle calculated by the joint shaft angle calculation unit 103.

In Step S112, the drive torque estimation unit 107 estimates the drive torque from drive shaft angle calculated by the drive shaft angle detection unit 102, and from the joint shaft angle calculated by the joint shaft angle calculation unit 103. In Step S113, the external torque calculation unit 108 calculates the external torque from the difference between the drive torque estimated by the drive torque estimation unit 107 and the actual torque command value calculated by the torque command value calculation unit 114. In Step S114, the external force calculation unit 109 calculates the external force as in Expression (4) from the external torque, which is calculated by the external torque calculation unit 108, by using the Jacobian matrix calculated by the Jacobian matrix calculation unit 105. In Step S115, the correction amount calculation unit 110 reads out the compliance model from the compliance model memory 205, and calculates the correction amount of the tip end position, which corresponds to the external force calculated by the external force calculation unit 109, as in Expression (6) by using the compliance model. Then, the processing returns to Step S102, and the error calculation unit 112 calculates the error that takes in consideration the correction amount, which is calculated by the correction amount calculation unit 110, for the error between the tip end position command value created by the position command value creation unit 111 as in Expression (7) and the tip end position calculated by the top end position calculation unit 104.

<Drive Torque Estimation Processing>

Figure 6:
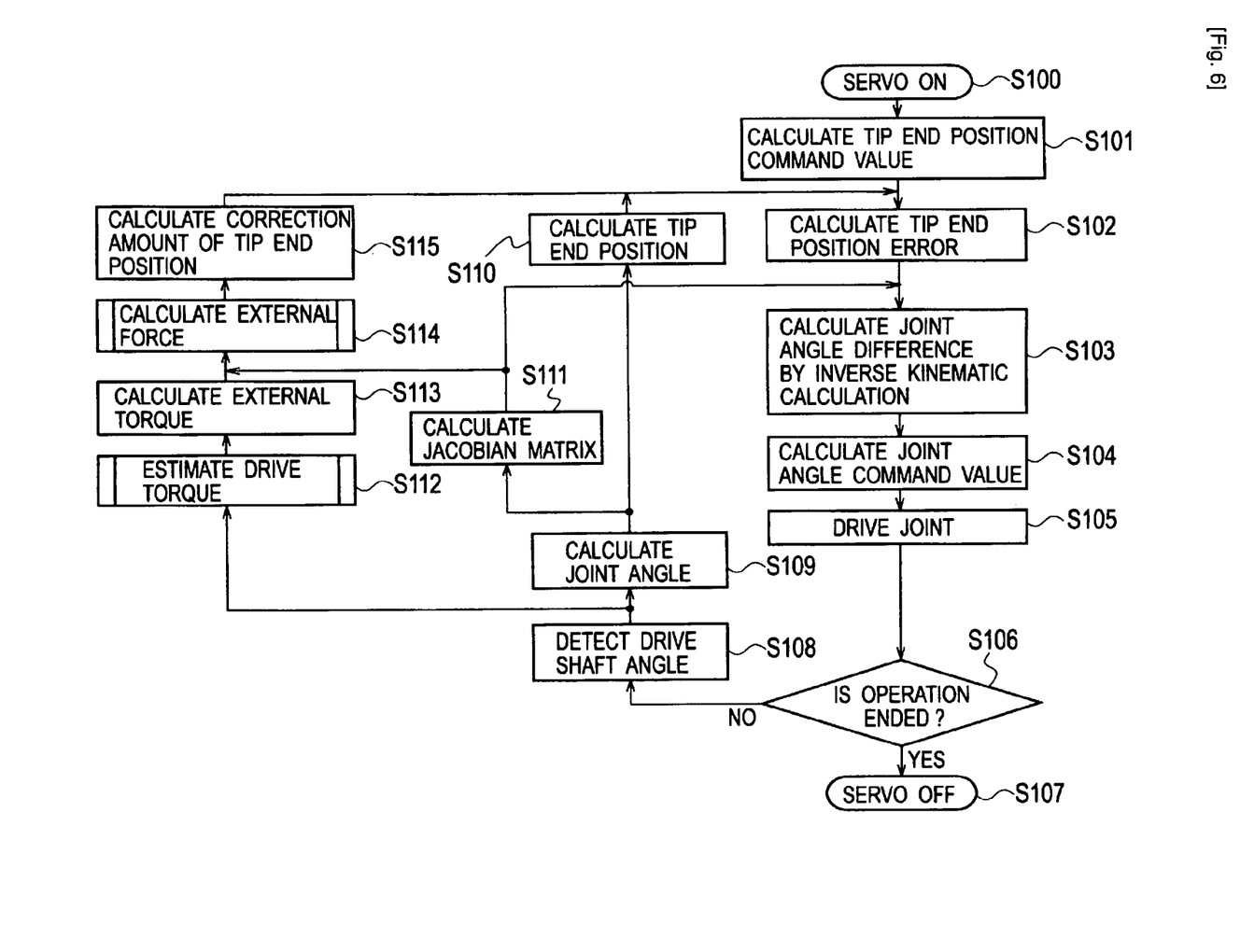
FIG. 6 is a flowchart showing an example of a robot control method according to the embodiment.

Next, a description will be made of the drive torque estimation processing of Step S112, which is shown in FIG. 6, while referring to a flowchart of FIG. 7.

In Step S200, the drive torque estimation processing is started. In Step S201, the drive shaft velocity calculation unit 400 takes the time difference from the drive shaft angle detected by the drive shaft angle detection unit 102, and thereby calculates the drive shaft velocity. Moreover, the friction torque calculation unit 401 reads out the friction coefficient from the friction coefficient memory 201, and calculates the friction torque from the friction coefficient and the drive shaft velocity calculated by the drive shaft velocity calculation unit 400.

In Step S202, the velocity calculation unit 410 takes the time difference of the joint shaft angle calculated by the joint shaft angle calculation unit 103, and thereby calculates the joint angular velocity. In Step S203, the acceleration calculation unit 411 takes the time difference of the joint angular velocity calculated by the velocity calculation unit 410, and thereby calculates the joint angular acceleration. In Step S204, the inertia moment calculation unit 412 reads out the link parameter from the link parameter memory 202, and calculates the inertia moment of the link in each joint from the link parameter and the joint shaft angle calculated by the joint shaft angle calculation unit 103. In Step S205, the inertia torque calculation unit 413 calculates the inertia torque from the joint angular acceleration calculated by the acceleration calculation unit 411 and the inertia moment calculated by the inertia moment calculation unit 412.

In Step S206, the gravity torque calculation unit 403 reads out the link parameter from the link parameter memory 202, calculates the gravity, which acts on each of the links 301 and 302, from the link parameter and the joint shaft angle calculated by the joint shaft angle calculation unit 103, and calculates the gravity torque that compensates the gravity concerned.

In Step S207, the adding unit 404 adds up the friction torque calculated by the friction torque calculation unit 401, the inertia torque calculated by the inertia torque calculation unit 413, and the gravity torque calculated by the gravity torque calculation unit 403, and calculates the thus obtained total as the estimated drive torque. In Step S208, the drive torque estimation processing is ended.

<External Force Calculation Processing>

Next, a description will be made of the external force calculation processing of Step S114, which is shown in FIG. 6, while referring to a flowchart of FIG. 8.

In Step S300, the external force calculation processing is started. In Step S301, the dead band processing unit 501 reads out the minimum threshold value (minimum external torque) stored in the threshold value memory 203, and determines whether or not the external torque in each shaft, which is calculated by the external torque calculation unit, is smaller than the minimum threshold value. If the external torque is smaller than the minimum threshold value, then the processing proceeds to Step S302, and the dead band processing unit 501 determines that the external torque to be located in the dead band as in Expression (2), and regards the external torque as 0. In the case where the external torque is determined to be the minimum threshold value or more, the dead band processing unit 501 maintains the value of the external torque as it is.

In Step S303, the saturation processing unit 502 reads out the maximum threshold value (maximum external torque) stored in the threshold value memory 203, and determines whether or not the external torque is larger than the maximum threshold value. In the case where the external torque is determined to be larger than the maximum threshold value, then the processing proceeds to Step S304, and the external torque is reduced to the value of the maximum threshold value as in Expression (3) in order to avoid the breakage of the control subject in contact with the tip end.

In Step S305, by using the Jacobian matrix calculated by the Jacobian matrix calculation unit 105, the torque-force conversion unit 503 multiplies the external torque by the inverse matrix of the transpose matrix of the Jacobian matrix as in Expression (4) based on the principle of virtual work, and thereby converts the external torque into the external force. In Step S306, in the case where the point of application of the external force is the point other than the tip end, the coordinate conversion unit 504 performs the coordinate conversion for the external force, of which point of application is other than the tip end, into the external force in the task coordinate system.

In Step S307, the threshold value setting unit 505 reads out the Jacobian matrix from the Jacobian matrix memory 204, and sets the minimum threshold value and the maximum threshold value in response to the rate of change of the Jacobian matrix. In Step s308, the external force calculation processing is ended.

As described above, in accordance with the embodiment of the present invention, the parameters included in algorithms of the friction coefficient, the dead band threshold values and the like are dynamically changed based on the task mode, operation velocity and the like of the robot, whereby the external torque generated by the external force that acts on the robot can be calculated highly accurately, and a precise correction amount of the tip end position can be calculated. As a result, stable force control for controlling the position and the force in the task coordinate system can be realized without using the force sensor.

Figure 7:
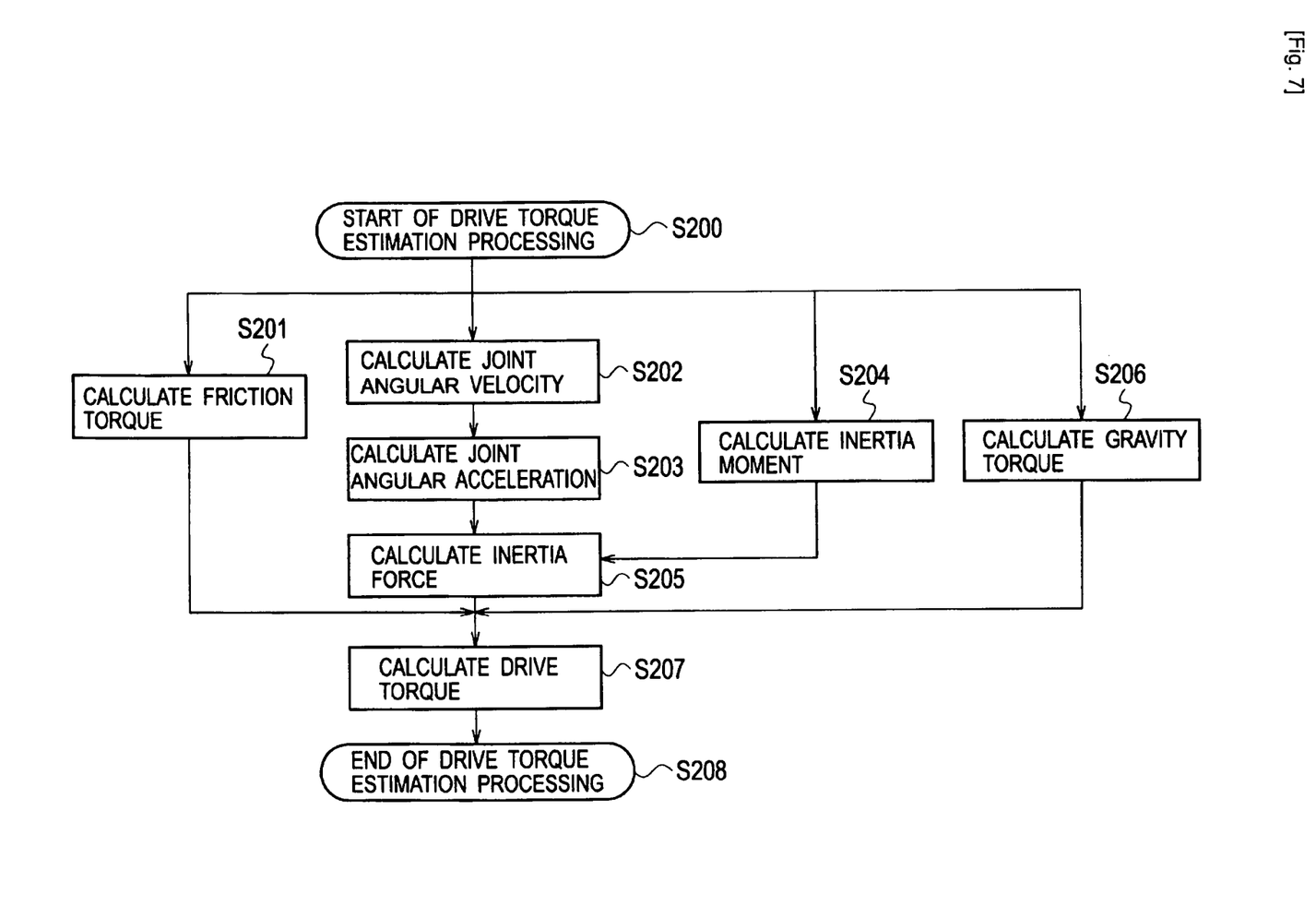
FIG. 7 is a flowchart showing an example of a drive torque estimation processing according to the embodiment.
Figure 8:
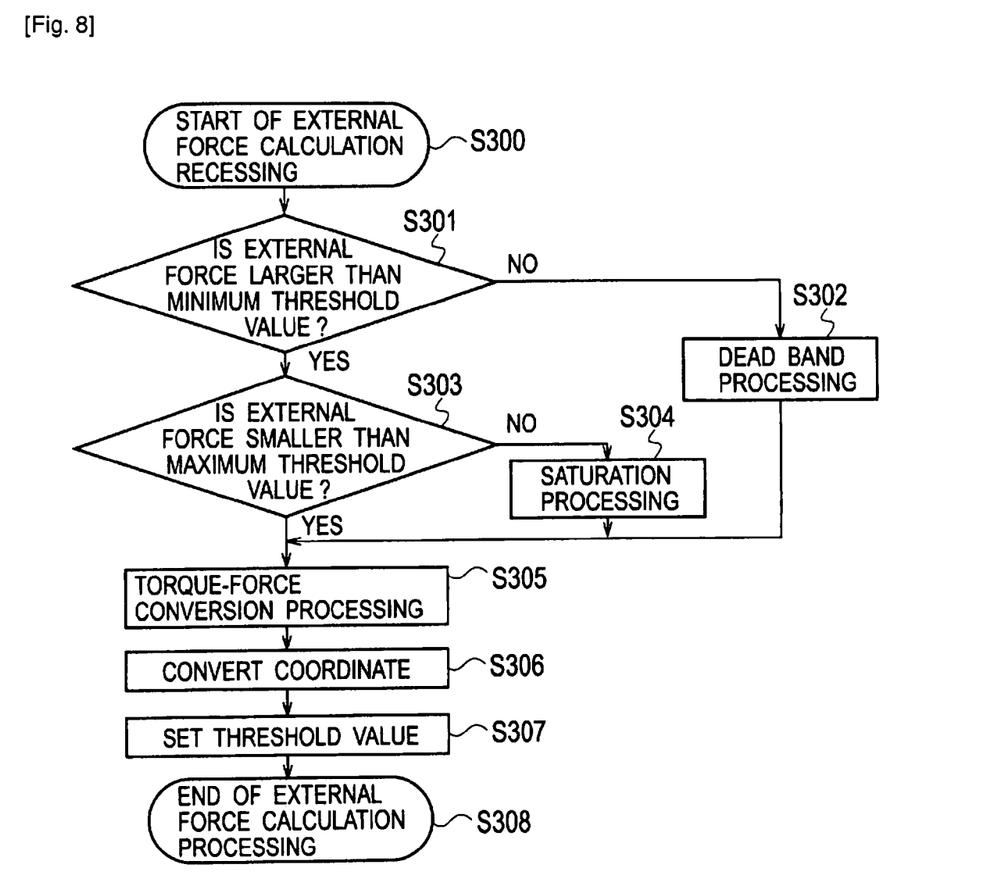
FIG. 8 is a flowchart showing an example of an external force calculation processing according to the embodiment.

Note that, the series of procedures shown in FIGS. 6 to 8 can be achieved by controlling the robot control apparatus shown in FIG. 1 by means of a program having an algorism equivalent to that of FIGS. 6 to 8. For example, the procedures include: a step of detecting a drive shaft angle by the drive shaft angle detection unit 102; a step of calculating a joint shaft angle from the drive shaft angle by the joint shaft angle calculation unit 103; a step of calculating a tip end position of the robot from the joint shaft angle by the tip end position calculation unit 104; a step of creating a position command value of the tip end position by the position command value creation unit 111; a step of calculating an error between the tip end position and the position command value by the error calculation unit 112; a step of calculating a joint angle difference from the error by inverse kinematic calculation by the joint angle difference calculation unit 113; a step of calculating a torque command value by integrating the joint angle difference by the torque command value calculation unit 114; a step of driving the actuator 115 based on the torque command value by the drive unit 101; a step of estimating a drive torque for driving the actuator 115 from the joint shaft angle by the drive torque estimation unit 107; a step of calculating a difference between the estimated drive torque and the torque command value as an external torque by the external torque calculation unit 108; a step of calculating a Jacobian matrix between a task coordinate system and a joint coordinate system of the robot based on the joint shaft angle by the Jacobian matrix calculation unit 105; a step of calculating an external force acting the tip end position from the Jacobian matrix and the external torque by the external force calculation unit 109; a step of calculating a correction amount for the position command value corresponding to the external force using a compliance model in the tip end position stored in the compliance model memory 205 by the correction amount calculation unit 110; and the like.

The program may be stored in, for example, the position data memory 200 or the like. The procedures of the method according to the embodiment of the present invention can be performed by storing the program in a computer-readable storage medium and reading the program from the computer-readable storage medium to the position data memory 201 or the like. Furthermore, it is possible to store a program in the position data memory 200 or the like via an information processing network, such as the Internet.

(First Modification)

As a first modification example of the embodiment of the present invention, a description will be made of a method of changing the parameter (gain) of the compliance model. For each joint of the robot, a magnitude of the friction torque differs owing to a difference in specifications of the velocity reducer, and the like. Accordingly, in the case where the compliance model is not provided, hardness (magnitude of minute displacement) against the external force at the tip end is not isotropic in an axial direction of the task coordinate system. Therefore, a difference in the threshold value of the dead band, which is set for each joint shaft, that is, a difference in the minimum external torque
[Math. 49]

$$\tau,$$

is allowed to reflect on the parameter, whereby estimation accuracy of the external force is further enhanced. The external torque and the external force in the task coordinate system have a relationship shown in Expression (4). Accordingly, the correction amount calculation unit 110 calculates an anisotropic parameter vector k as in Expression (9) from the minimum external torque
[Math. 50]

$$\tau_{dmin}$$

stored in the threshold value memory 203 and the transpose matrix of the Jacobian matrix stored in the Jacobian matrix memory 204.
[Math. 51]

$$k=(J^T)^{-1}\tau_{dmin} \quad (9)$$

The correction amount calculation unit 110 corrects the parameter of the compliance model as in Expression (10) by using the anisotropic parameter vector k.
[Math. 52]

$$K_{fi}'=K_{fi}k_i/|k| \quad (10)$$

where $K_{fi}$ is a diagonal component element of a force feedback matrix in an i-th axis (x, y, z, a, b, c) in the task coordinate system, and $K_{fi}'$ is the corrected $K_{fi}$, and
[Math. 53]

$$|k|$$

is a norm of k. In such a way, the parameter of the compliance model, which is set anisotropically in response to the task mode of the robot, that is, to the tip end direction and the operation direction during the task can also be expressed without any contradiction.

(Second Modification)

As a second modification example of the embodiment of the present invention, a description will be made of the case of using an inverse transform capable of directly calculating the joint angle from the tip end position without using the Jacobian matrix as in Expression (8). In this case, as in Expression (11), the joint angle difference calculation unit 113 calculates a new tip end position x obtained by adding the correction amount
[Math. 54]

$$\Delta X_{comp}$$

of the tip end position, which is calculated by the correction amount calculation unit 110, to the tip end position command value $X_R$ created by the position command value creation unit 111.
[Math. 55]

$$x=x_R+\Delta x_{comp}$$

The torque command value calculation unit 114 multiplies the new tip end position x by the inverse transform
[Math. 56]

$$\Lambda^{-1},$$

and thereby calculates the torque command value
[Math. 57]

$$\theta_R$$

as in Expression (12).
[Math. 58]

$$\theta_R=\Lambda^{-1}x \quad (12)$$

Other Embodiment

Various modifications will become possible for those skilled in the art after receiving the teachings of the present disclosure without departing from the scope thereof.

Figure 9:
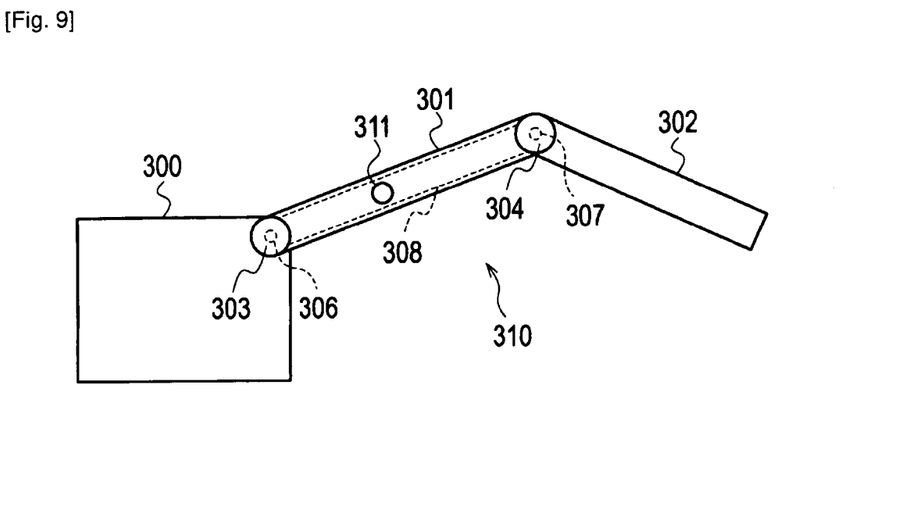
FIG. 9 is a block diagram showing an example of a robot control apparatus according to other embodiment of the present invention.

For example, in the embodiment of the present invention, at the time of calculating the inertia torque, used is the joint angular acceleration calculated for the double time differences of the joint shaft angle by the velocity calculation unit 410 and the acceleration calculation unit 411; however, depending on the control cycle, a time delay is increased, and a torque error becomes prone to be increased. In such a case, a procedure may be adopted, in which an acceleration of the link 301 is detected from an acceleration sensor 311 mounted on the link 301 as shown in FIG. 9, the detected acceleration is converted into the joint angular acceleration by the acceleration calculation unit 411, and the inertia torque is calculated based on the joint angular acceleration.

Moreover, as the drive torque estimation processing, there is shown an example of estimating the drive torque from the friction torque, the inertia torque and the gravity torque; however, the drive torque estimation processing is not limited to this example. For example, parameters such as centrifugal force and Coriolis force may be further taken into consideration.

Moreover, the CPU 100, the position data memory 200, the friction coefficient memory 201, the link parameter 202, the threshold value memory 203, the Jacobian matrix memory 204 and the compliance model memory 205 and the like may be embedded into an inside of the robot, which is a control subject, and may be integrated therewith. Moreover, it is also possible to arrange the CPU 100, the position data memory 200, the friction coefficient memory 201, the link parameter 202, the threshold value memory 203, the Jacobian matrix memory 204 and the compliance model memory 205 and the like on an outside of the robot, and to remotely control the robot from the outside by wire or wirelessly.

INDUSTRIAL APPLICABILITY

The present invention can be used for a robot control apparatus and a robot control method.

REFERENCE SIGNS LIST

100 Central processing unit
101 Drive unit
102 Drive shaft angle detection unit
103 Joint shaft angle calculation unit
104 Top end position calculation unit
105 Jacobian matrix calculation unit
107 Drive torque estimation unit
108 External torque calculation unit
109 External force calculation unit
110 Correction amount calculation unit
111 Position command value creation unit
112 Error calculation unit
113 Joint angle difference calculation unit
114 Torque command value calculation unit
115 Actuator
200 Position data memory
201 Friction coefficient memory
202 Link parameter memory
203 Threshold value memory
204 Jacobian matrix memory
205 Compliance model memory
300 Body
301, 302 Link
303 Drive pulley
304 Driven pulley
305 Joint shaft angle detection unit
306 Drive shaft (joint)
307 Joint shaft (joint)
308 Transmission mechanism
309 Velocity reducer
310 Movable portion
311 Acceleration sensor
400 Drive shaft velocity calculation unit
401 Friction torque calculation unit
402 Inertia torque calculation unit
403 Gravity torque calculation unit
404 Adding unit
410 Velocity calculation unit
411 Acceleration calculation unit
412 Inertia moment calculation unit
413 Inertia torque calculation unit
501 Dead band processing unit
502 Saturation processing unit
503 Torque-force conversion unit
504 Coordinate conversion unit
505 Threshold value setting unit

The invention claimed is:

1. A robot control apparatus controlling a robot having a joint shaft and a drive shaft transmitting a drive force from an actuator to the joint shaft, comprising:
an angle detection unit configured to detect an angle of the drive shaft;
a angle calculation unit configured to calculate an angle of the joint shaft from the angle of the drive shaft;
a position calculation unit configured to calculate a tip end position of the robot from the angle of the joint shaft;
a command value creation unit configured to create a position command value of the tip end position;
an error calculation unit configured to calculate an error between the tip end position and the position command value;
a difference calculation unit configured to calculate a joint angle difference from the error by inverse kinematic calculation;
a command value calculation unit configured to calculate a torque command value by integrating the joint angle difference;
a drive unit configured to drive the actuator based on the torque command value;
a drive torque estimation unit configured to estimate a drive torque for driving the actuator from the angle of the joint shaft;
an external torque calculation unit configured to calculate a difference between the estimated drive torque and the torque command value as an external torque;
a Jacobian matrix calculation unit configured to calculate a Jacobian matrix between a task coordinate system and a joint coordinate system of the robot based on the angle of the joint shaft;
an external force calculation unit configured to calculate an external force acting the tip end position from the Jacobian matrix and the external torque;
a compliance model memory configured to store a compliance model in the tip end position; and
a correction amount calculation unit configured to calculate a correction amount for the position command value corresponding to the external force using the compliance model, and configured to changes gain for the compliance model from the Jacobian matrix.

2. The apparatus of claim 1, further comprising:
a friction coefficient memory configured to store a friction coefficient in the tip end position,
wherein the drive torque estimation unit comprises:
a drive shaft velocity calculation unit configured to calculate a velocity of the drive shaft from the angle of the joint shaft;
a friction torque calculation unit configured to calculate a friction torque from the velocity of the drive shaft and the friction coefficient;
a gravity torque calculation unit configured to calculate a gravity torque from the angle of the joint shaft;
an inertia torque calculation unit configured to calculate an inertia torque from the angle of the joint shaft; and
an adding unit configured to add up the friction torque, the gravity torque and the inertia torque for calculating the drive torque.

3. The apparatus of claim 2, wherein the inertia torque calculation unit comprises:
a velocity calculation unit configured to calculate a joint angular velocity from the angle of the joint shaft;
a acceleration calculation unit configured to calculate a joint angular acceleration from the joint angular velocity;
an inertia moment calculation unit configured to calculate an inertia moment of a link of the robot from the angle of the joint shaft; and
an inertia torque calculation unit configured to calculate an inertia torque from the joint angular acceleration and the inertia moment.

4. The apparatus of claim 3, further comprising:
a threshold value memory configured to store a minimum threshold value and a maximum threshold value for the external torque; and
a link parameter memory configured to store a link parameter of the robot,
wherein the external force calculation unit comprises:
a dead band processing unit configured to regard the external torque as 0 when the external torque is smaller than the minimum threshold value;
a saturation processing unit configured to reduce the external torque to a value of the maximum threshold value when the external torque is larger than the maximum threshold value;
a torque-force conversion unit configured to convert the external torque into an external force using the Jacobian matrix;
a coordinate conversion unit configured to convert the external force into an external force in an actual point of application using the link parameter; and
a threshold value setting unit configured to set the minimum threshold value and the maximum threshold value from the Jacobian matrix respectively.

* * * * *